(No Model.)
H. R. CASSEL.
PROCESS OF THE EXTRACTION OF GOLD, &c., FROM ORES.
No. 351,576. Patented Oct. 26, 1886.
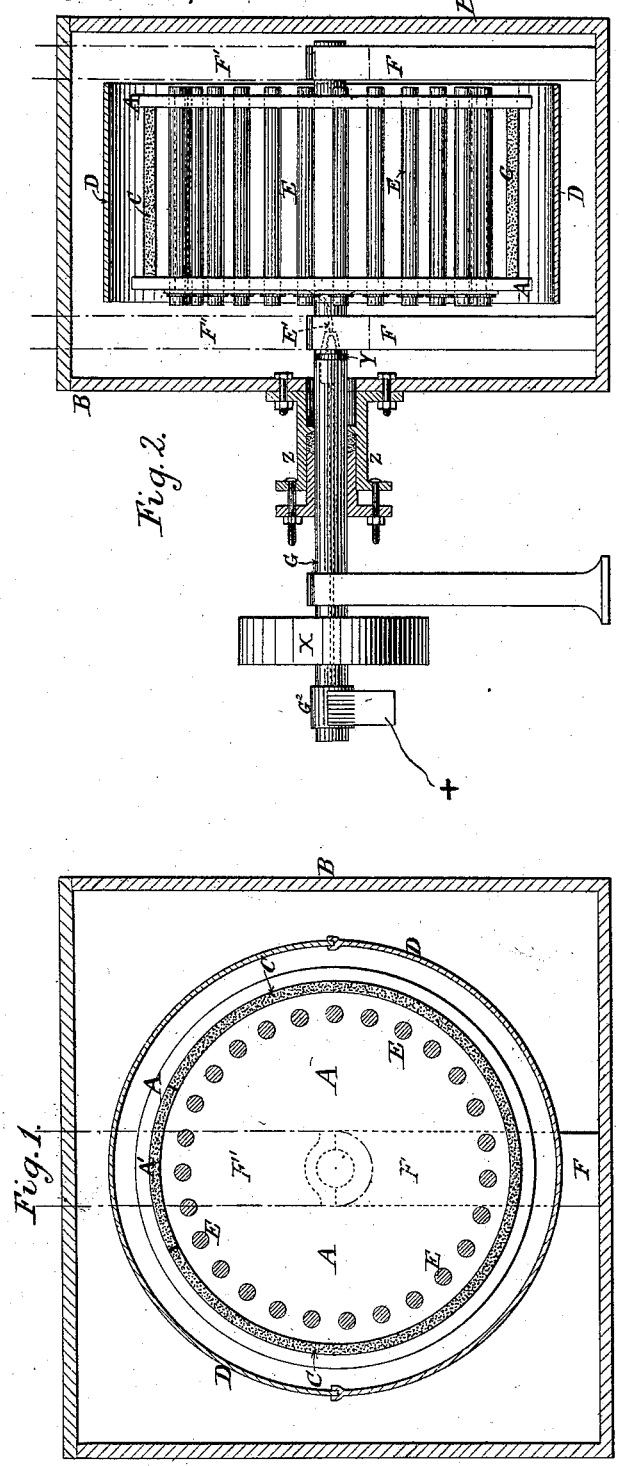
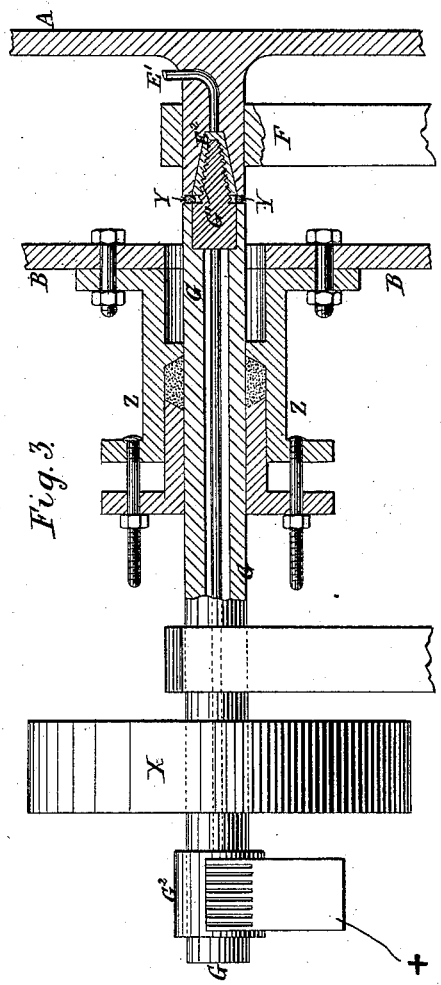

UNITED STATES PATENT OFFICE.

HENRY R. CASSEL, OF LONDON, COUNTY OF MIDDLESEX, ENGLAND, ASSIGNOR TO THE CASSEL GOLD EXTRACTING COMPANY, (LIMITED,) OF GLASGOW, SCOTLAND.

PROCESS OF EXTRACTING GOLD, &c., FROM ORES.

SPECIFICATION forming part of Letters Patent No. 351,576, dated October 26, 1886.

Application filed June 25, 1885. Serial No. 169,722. (No specimens.) Patented in England August 9, 1883, No. 3,873; in France February 9, 1884, No. 160,213; in Germany March 14, 1884, No. 31,105; in Belgium March 29, 1884, No. 64,667; in Victoria April 29, 1884, No. 3,709; in New Zealand May 8, 1884, No. 1,110; in India July 16, 1884, No. 75; in Spain August 8, 1884, No. 6,023; in New South Wales August 29, 1884, No. 8,880; in Queensland September 6, 1884, No. 7, page 183; in Austria-Hungary September 20, 1884, No. 10,926 and No. 42,323, and in Canada January 13, 1885, No. 20,877.

*To all whom it may concern:*

Be it known that I, HENRY RENNER CASSEL, a citizen of the United States, residing temporarily at 52 Chancery Lane, London, in the county of Middlesex, England, electrician, have invented a new and useful Improvement in Processes for the Extraction of Gold and other Metals from Ores or other Substances, (for which I have received Letters Patent in England, No. 3,873, dated August 9, 1883; Letters Patent in France, No. 160,213, dated February 9, 1884; Letters Patent in Germany, No. 31,105, dated March 14, 1884; Letters Patent in Belgium, No. 64,667, dated March 29, 1884; Letters Patent in Spain, No. 6,023, dated August 8, 1884; Letters Patent in Austria, No. 10,926/42,323, dated September 20, 1884; Letters of Registration in New South Wales, No. 8,880, dated August 29, 1884; Letters Patent in New Zealand, No. 1,110, dated May 8, 1884; Letters of Registration in Queensland, No. 7, page 183, dated September 6, 1884; Letters Patent in Victoria, No. 3,709, dated April 29, 1884; Letters Patent in India, No. 75, dated July 16, 1884, and Letters Patent in Canada, No. 20,877, dated January 13, 1885;) and I do hereby declare that the following is a full, clear, and exact description of the invention.

In a previous patent granted to me in the United States, No. 300,950, dated June 24, 1884, I have described a method of treating ores and alloys, &c., by means of nascent chlorine, which is generated in an apparatus in which the anode and cathode are separated by a porous partition of clay, so as to prevent the deposition of the dissolved metals upon the cathode.

The object of the present invention is to secure the advantages of the process described in said patent as regards the extraction of the metals from the ore, and at the same time to secure the deposition of the dissolved metals at one and the same operation.

In carrying out the present invention the ores or alloys are charged in a powdered condition into an anode-compartment, which is separated from the cathode-compartment by a porous partition composed of asbestus, which permits the passage of the current and of the metals in solution, and retains the ores within the anode-compartment, said anode-compartment containing a chloride solution. The charge is then agitated and subjected to nascent chlorine produced from said solution during the passage of the electric current, whereby the metals are dissolved. The solution of metals is then passed through the asbestus partition into the cathode-compartment, and the metals in solution are then precipitated at the cathode. The apparatus I employ for this purpose is shown in Figs. 1 and 2 of the accompanying drawings; and it consists of a revolving drum, A, suspended in a vat, B. Around the circumference of the drum strong asbestus-cloth C or other filtering material is secured in any suitable manner for the purpose of retaining the minerals in the drum. This material, however, allows the dissolved metals to pass through it to be deposited on the negative pole D, which is contained in the vat. Inside the drum A are arranged a number of carbons, E, the whole of which are connected with the positive pole of a dynamo-machine or other source of electricity, so as to form the anodes. The drum A is preferably entirely submerged in the vat B, and the manner of supporting it, while allowing it to revolve freely, and at the same time connecting the carbons E to the source of electricity, is shown in detail in Fig. 3. The shaft of the drum A rests on brackets or supports F, provided for that purpose in the vat B. Through one end of the shaft a metallic rod, $E'$, is inserted, and metallically connected with the carbons E. This rod $E'$ is preferably made of copper, and terminates in a female screw, $E^2$. Through the side of the vat B, and opposite this female screw, a shaft, G, is inserted, and terminates in a male copper-screw, $G'$, a pulley, X, being provided on the shaft outside the vat for the purpose of causing it to rotate. The shaft G on being turned screws the part G' into the female screw E² of the shaft of the drum, and the latter then revolves. A rubber washer, Y, is inserted between the ends of the two shafts, so as to exclude the solution contained in the vat from the screw-connections. At the end of the shaft G is arranged a copper plate or disk, G², which is connected to the male screw G', and a metallic connection (by means of copper wire or plate, brushes, or otherwise) serves to convey the current to the carbons E, or any other suitable means may be used to convey the current to the carbons. Instead of the screw-connections constituting the means for conveying the current, the wires may terminate so as to be capable of being brought into contact from the outside of the tank by any suitable means, and, if preferred, the drum may be caused to revolve by means of toothed gearing.

Instead of supporting the drum A in the vat B on the brackets F, it may be suspended from above the vat, as shown by the broken lines F' in Figs. 1 and 2.

To prevent leakage from the vat B through the shaft-hole in its side, a stuffing-box, Z, is used. The screws, copper rods, and other metal connections must be well insulated by suitable means to prevent corrosion.

The ores to be treated are introduced into the drum A by means of an opening, A'. The vat B contains the negative pole or cathode D, which preferably surrounds the drum A, and when it entirely surrounds the same it may be made in two halves, both being properly connected with the other pole of the dynamo-machine.

By my improved apparatus, as the drum is preferably entirely submerged in the solution, the current enters the solution through all the carbons; consequently a very strong disengagement of chlorine immediately takes place and the gold contained in the ores is readily converted into chloride of gold.

What I claim as my invention, and desire to secure by Letters Patent, is—

The process of separating metals from ores or alloys, especially those of an auriferous character, which consists in charging the ore or alloy in a powdered condition into an anode-compartment, which is separated from the cathode-compartment by a porous partition composed of asbestos, which permits the passage of the current with the metals in solution, and retains the ores within the anode-compartment, said anode-compartment containing a chloride solution, agitating and subjecting the charge to nascent chlorine produced from said solution during the passage of the electric current, passing the solution of metals through the asbestos partition, and depositing the metals in solution at the cathode, substantially as described.

HENRY R. CASSEL.

Witnesses:
   CHAS. A. ALLISON,
      52 Chancery Lane, London.
   T. M. BANKIER,
      8 Grays Inn Place, London.